Figure 1:
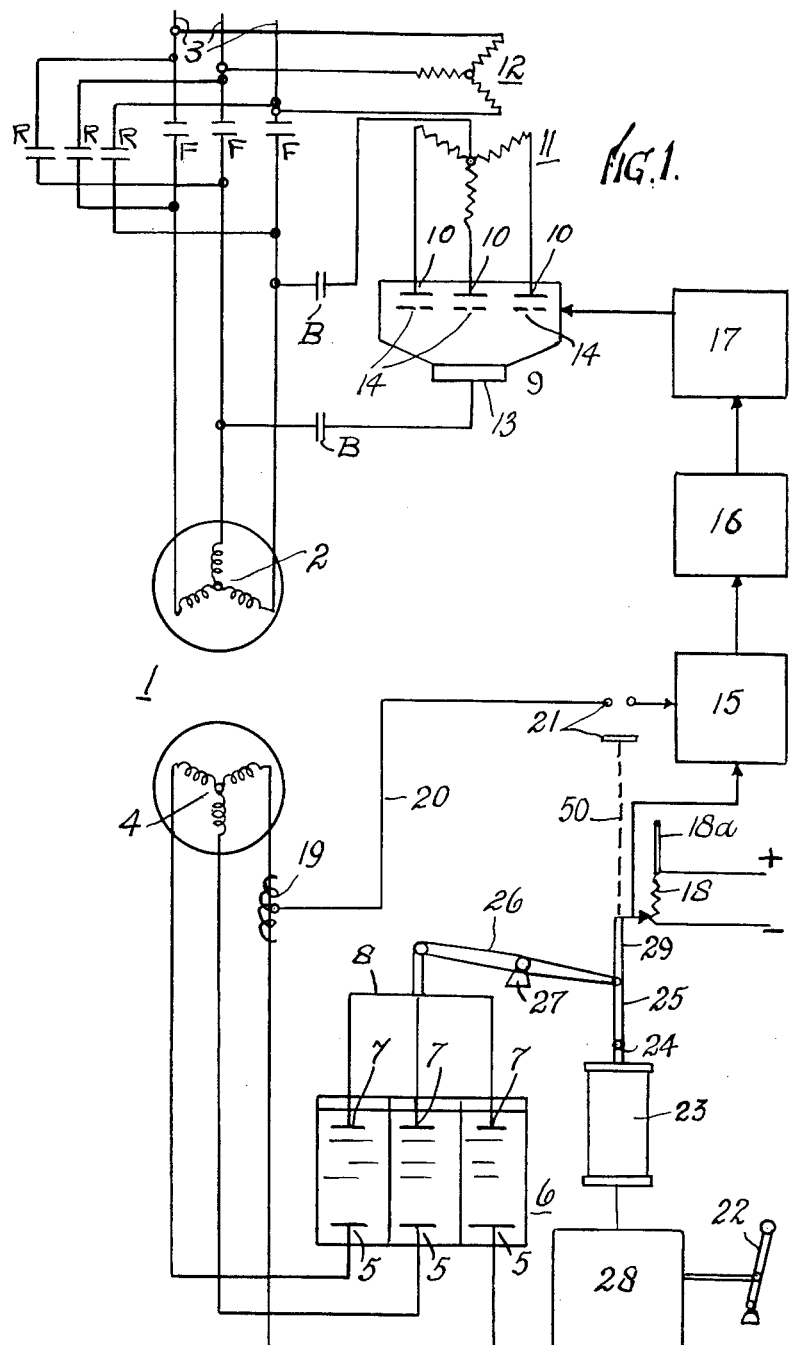

United States Patent Office 2,746,000
Patented May 15, 1956

2,746,000

CONTROL OF ALTERNATING CURRENT ELECTRIC MOTOR EQUIPMENT

Ronald Parr, Davyhulme, and Owen Thomas Evans, Sale, England, assignors to Metropolitan-Vickers Electrical Company Limited, London, England, a British company Application June 28, 1954, Serial No. 439,846

7 Claims. (Cl. 318—212)

This invention relates to alternating current induction motor equipment having control means for obtaining dynamic braking, that is to say in which for retarding a load coupled with the motor one winding of the motor is connected in a direct current exciting circuit whereby to generate current in the co-operating winding, and the latter winding is connected in a closed circuit through a variable load resistance whereby the braking torque can be adjusted. Usually, and as will hereinafter be assumed, the stator winding of the motor is connected in the direct current exciting circuit whilst the rotor is connected in the closed circuit, this arrangement enabling the same variable resistance to be employed for control of the dynamic braking as is employed for control of the motoring torque when the first-mentioned winding is connected with the alternating current supply. Equipments of the kind referred to are, for example, employed for electrically operated winders, hoists or the like.

It is well known that under dynamic braking the braking torque obtained at any given rotor speed and given value of excitation increases with progressive reduction of rotor resistance until a maximum value of torque is obtained at a particular value of rotor resistance, which is commonly referred to as the "critical" resistance. Further reduction of the rotor resistance below this critical value results in a rapid decrease of the braking torque and when the resistance is reduced to zero the torque is substantially zero. The value of critical resistance depends for any given speed on the value of the excitation, the critical resistance falling as the excitation is increased. As is also well known, the characteristics above described are such that the resistance necessary to produce a given value of torque with a given value of excitation varies in direct proportion to the speed.

The fall of braking torque with reduction of rotor resistance below the critical value leads to instability of control inasmuch as in the case of a manually controlled winder the driver, whilst being able to increase the braking torque progressively by movement of a lever to reduce the rotor resistance until that position of the lever is reached giving for the prevailing values of speed and excitation the critical resistance, further movement of said lever, with the intention of still further increasing the braking torque, will in fact result in a reduction of braking torque. Moreover, in the case of winders the removal of rotor resistance is commonly made to occur according to a time schedule, for example in the case of a liquid rotor resistance operated by an oil servo engine the speed of movement of the latter is set to a value such that under predetermined conditions of load the rotor resistance will be reduced at such a rate that movement of the driver's lever to the full braking position will produce a desired rate of retardation of the winder. If, however, due to variation of load conditions the winder is not retarded at the scheduled rate then the reduction of rotor resistance occurs too rapidly and the resistance is reduced below the critical value. This effect is cumulative and the result is that braking torque is finally lost completely. The same effect will occur in the case of resistance of the metallic form adjustable by means of contactors adapted to short-circuit sections of such resistance under control of time delay relays or interlock sequence contacts.

The loss of braking torque referred to will also lead to instability in the case of automatic winders wherein the reduction of rotor resistance is made to depend on the position of the winder, such as by a cam-operated gear.

Various control systems have heretofore been proposed with a view to avoiding the danger above described. In the case of manually controlled winders it has been proposed to control the motor excitation concurrently with the rotor resistance so that the excitation is increased with reduction of rotor resistance from the maximum value, this arrangement progressively reducing the critical value of rotor resistance as the driver's lever or the like is moved to the full on position.

These arrangements are, however, subject to the objection that if the co-ordination of excitation with rotor resistance is effected by coupling the excitation control means with the driver's lever or with the rheostat itself, then the requisite relation between resistance and excitation will not be obtained except for one particular value of electrolyte strength in the case of a liquid rheostat. Furthermore the critical resistance for a given excitation varies in proportion to the speed so that, ideally, at reduced speeds a given excitation should be arranged to occur at lower values of rotor resistance than at higher speeds. The simple common control such as by mechanical co-ordination between the driver's lever, the excitation control means and the rotor resistance does not provide this variation of excitation also in accordance with speed. The result is that at the reduced speeds the torque is comparatively low with maximum excitation; in order to obtain further increase in torque the rotor resistance may be varied whilst maintaining constant excitation. With this arrangement the excitation is inefficiently utilised and sustained operation of the winder at low speed may result in overheating of the motor.

In alternative arrangements heretofore proposed, the excitation, instead of being controlled in dependence on the rotor resistance by means of a resistance or other regulating means adjustable by the driver's lever simultaneously with the adjustment of the rotor resistance, is caused to depend automatically on the value of current in the rotor winding of the motor. The relation between braking torque and rotor current remains constant under nearly all conditions, including variations, of speed and the arrangements in question have therefore operated by causing the exciting current to be a function of the rotor current and so maintain the torque in a constant relationship to the stator current.

In some cases the excitation current has been derived directly by rectification from the rotor current whilst in other cases the excitation current has been provided by some form of power amplifier, such as an exciter or mercury arc rectifier or a transductor controlled by amplifying means, conveniently also comprising a transductor, having an input circuit energised in accordance with the rotor current. The use of an amplifier in this manner is preferable to the direct derivation of the excitation current from the rotor current since it is thereby possible to obtain desirable relationship between the exciting current and the rotor current. For various reasons, however, the choice of characteristic is limited by stability considerations and in general it is found that the stator excitation cannot be reduced below a certain minimum value. It is frequently desirable, particularly in the case of automatic winders, although the invention is not limited to automatic winders, that progressive control of torque from zero to the maximum value shall be obtainable. The present invention has for its object to provide a control system whereby such progressive control is readily obtainable.

According to the present invention, therefore, in an alternating current induction motor equipment having control means for obtaining dynamic braking by supplying excitation current to one winding of the motor and controlling load resistance in circuit with a co-operating winding of the motor, said control means comprise means for controlling the value of excitation of the motor, means representative of the value of said load resistance, and means responsive to the current in said second winding, in combination with means rendering the excitation dependent on the value of load resistance or said current responsive means, according as said resistance is within a higher or lower range of values. By this means, for higher values of the resistance the excitation is controlled in accordance with the value of said resistance independently or substantially independently of said current in said second winding, whereas for lower values of said resistance said means responsive to the current in said second winding are rendered effective so as to control the motor excitation during further reduction of said resistance. With this arrangement the control of excitation in accordance with load resistance is operative over the initial torque range, but the excitation for the higher values of torque depends upon the current, and changes in electrolytic strength and other factors will not affect the final peak torque or the torque characteristic at the higher values of torque.

The power amplifying means preferably comprises a mercury arc rectifier having grid or other control elements connected with the excitation control means. The mercury arc rectifier provides rapid response of the motor excitation to changes in the control with consequent stability of operation, particularly in the case of automatic winders where the motor excitation is controlled by a closed loop control system, namely in accordance with the difference between the actual speed of the winder at any time and the scheduled speed at that time. It will be understood, however, that the invention is not limited to the employment of a mercury arc rectifier for the amplifier and other arrangements may be employed such as, for example, a motor-driven exciter or a transductor having a control winding connected with the excitation control means.

Figure 2:
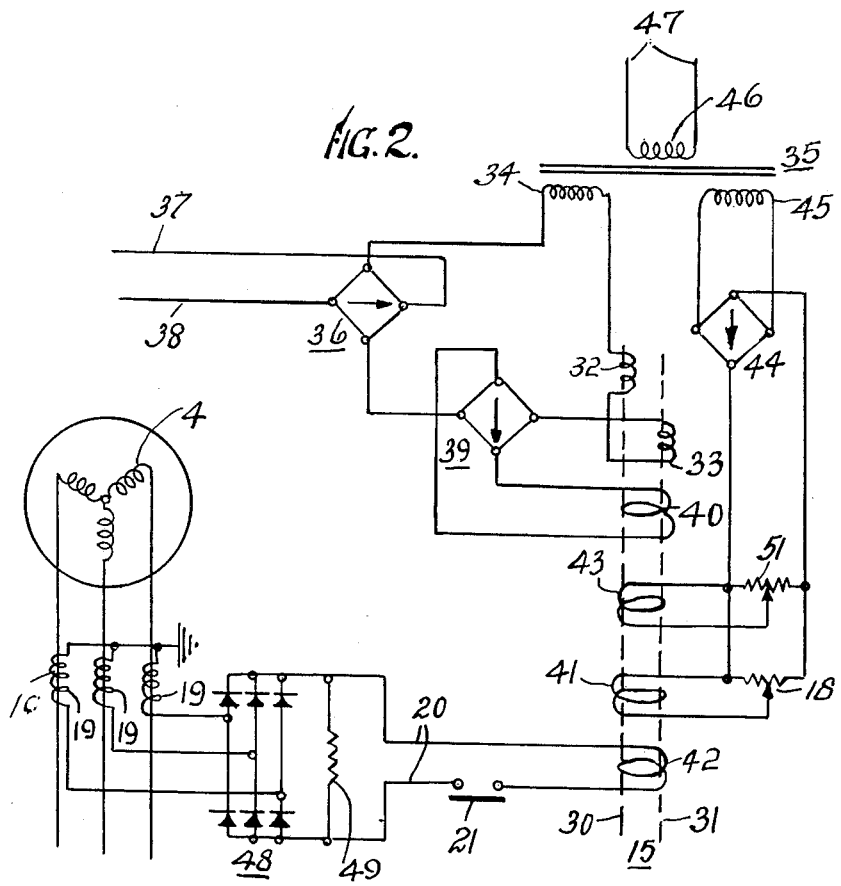

Reference will now be made by way of example to the accompanying drawings, in which:

Fig. 1 is an electrical circuit diagram showing diagrammatically a winder arranged in accordance with the invention, and Fig. 2 is an electrical circuit diagram illustrating a preferred arrangement of amplifier in the winder equipment of Fig. 1.

In Fig. 1, the winder motor is shown at 1 and has a stator winding 2 connected with three-phase supply conductors 3 by means of the usual alternatively closable forward and reverse contactors F and R, and a rotor winding 4 connected with the fixed electrodes 5 of a liquid rheostat 6 having movable electrodes 7 connected together electrically and mechanically by a bridging member 8 and adapted to be moved by means hereinafter to be described. For obtaining dynamic braking the stator winding 2 is connected, by closure of a braking contactor B, in the output circuit of an amplifier 9. In the example illustrated, this amplifier comprises a mercury arc rectifier having anodes 10 connected with the secondary winding 11 of a transformer having a primary winding 12 connected with the polyphase supply conductors 3, a cathode 13 and grids or other control electrodes 14. Other forms of amplifier may, however, be employed, for example a motor-driven exciter for example energized from the supply lines 3 and having a controlling field winding connected in the control circuits hereinafter to be described in place of the grids 14, or a magnetic amplifier or transductor again having an alternating current circuit supplied for example from the polyphase supply lines 3 and having a controlling winding connected with said control circuits. In the example illustrated the rectified output from the amplifier 9 is supplied by means of the braking contactor to two phases of the stator winding 2.

The control grids of the rectifier 9 or other control circuit in other forms of amplifier are connected in a control circuit which comprises a control amplifier 15 which preferably consists of a transductor arranged as hereinafter to be described with reference to Fig. 2. In the example illustrated employing a mercury arc rectifier, the output of the control amplifier 15 is connected through a phase shifting circuit 16 and preferably a peaking circuit 17 for determining, in accordance with the output of the control amplifier, the phase of alternating voltages applied to the control grid of the rectifier whereby to determine the output current of the latter. The phase shifting circuit 16 and peaking circuit 17 may be of any of the forms well known in the art so that further description thereof is deemed unnecessary herein. As is well known in the art, the phase shifting circuit operates so that the firing point of each anode 10 of the amplifier will depend upon the magnitude of a direct current voltage supplied to the input circuit of the phase shifting circuit 16.

As will hereinafter be described with reference to Fig. 1, the control amplifier 15 is provided with two control circuits, one of which includes a control potentiometer 18 and the other of which is energised in accordance with the rotor current of the motor as indicated diagrammatically in Fig. 1 by a current transformer 19 and line 20. The circuit includes contacts 21 operated as hereinafter to be described so as to render the current transformer 19 effective to control the amplifier 15 only under predetermined conditions.

The liquid rheostat is controlled in accordance with the operation of a driver's control lever 22 in any suitable way, for example by means of a fluid pressure servo device 23 having a piston connected by a piston rod 24, link 25, and lever 26 pivoted at 27 with the bridging member 8 connecting the movable electrodes 7. The admission of pressure fluid to the cylinder of the servo motor 23 is controlled by suitable control valves and operating means therefor represented diagrammatically at 28. These control means may be of the noncorresponding type, but are preferably of the corresponding type, and may be operated directly in accordance with the movement of the driver's control lever 22, for manual control, or may include a closed loop control system for automatic winding. In the latter case, for example, the control means 28 may include an electrical circuit for energising the operating coil of control valve means for the device 23, which circuit comprises in series opposition, a tachometer generator driven by the motor 1, and a reference potentiometer displaceable such as by a cam gear in accordance with the position of the winder so as to determine a reference voltage representative of the required speeds of the winder throughout the wind. Alternatively, said reference potentiometer might be operable by the control lever 22 so that the speed of the winder will be controlled as a predetermined function of the displacement of said lever.

The moving contact of the potentiometer 18 is mechanically coupled by means of a link 29 with the lever 26 so that the voltage derived from said potentiometer will be maintained in a predetermined relation with the position of the movable electrodes 7 of the liquid rheostat 6. As will hereinafter appear, the output of the control amplifier 15 is controlled by the potentiometer 18 or by the current transformer 19 according as the rotor resistance is above or below a predetermined value. The operation of the system will be described after the preferred circuit for the control amplifier 15, shown in Fig. 1, has been described.

Referring to Fig. 2, the control amplifier therein shown comprises a transductor consisting of the usual pair of magnetic cores represented diagrammatically by the broken lines 30 and 31, having a pair of output windings 32 and 33 connected in series with one another as shown, or alternatively in parallel with one another if desired, and in series with a secondary winding 34 of an input transformer 35, and an output rectifier 36, conveniently of the full wave dry plate type, with input conductors 37 and 38 for the phase shifting circuit 16 of Fig. 1. The output circuit just above described of the transductor includes a further rectifier 39, again conveniently of the full wave dry plate type, the output terminals of which are connected with a feedback winding 40 wound on both the cores 30 and 31. The transductor includes also two control windings 41 and 42 and a biasing winding 43 also each wound on both of the cores. The windings 40—43 inclusive conveniently comprise single windings embracing both cores although separate sections may be employed on the two cores in any of said windings.

The control winding 41 is connected to receive the output of the reference potentiometer 18 (also Fig. 1) which in the example illustrated is supplied with direct current derived by means of a rectifier 44 conveniently of the full wave dry plate type, and a further output winding 45 of the input transformer 35. A primary winding 46 of said transformer is connected with suitable constant voltage alternating current supply conductors 47.

The control winding 42 is connected for energisation in accordance with the rotor current of the motor, and for this purpose in Fig. 2, the current transformers 19 have their secondary windings connected by means of a three-phase rectifier 48, preferably of the dry plate type with a load resistor 49, across which the winding 42 is connected under control of the contacts 21. These contacts 21 are operated, as indicated diagrammatically at 50 in Fig. 1, by a mechanical connection with the lever 26 so as to be opened when the electrodes 7 have been lowered to a predetermined position, as hereinafter referred to in more detail.

The biasing winding 43 is supplied with a direct current derived from an adjustable preset potentiometer 51 connected across the output of the rectifier 44. The directions of connections of the various rectifiers are such that the windings 41 and 42, acting in the same direction as one another, act in opposition to the biasing winding 43, whilst the feedback winding 40 acts in the same direction as the windings 41 and 42. The feedback winding, by selection of the number of turns thereof permits the amplification of the transformer to be selected for optimum amplification as well known in the transductor art, the amplification characteristics being determined also by the fixed but adjustable biasing ampere turns provided by the winding 43.

The output current of the transductor, supplied to the input conductors 37 and 38 of the phase shifting circuit 16, is dependent upon the resultant control ampere turns produced by the windings 41 and 42. The phase shifting circuits are arranged so that increase of said current will increase the output current of the rectifier and thereby increase the excitation of the motor during dynamic braking.

In operation, in order to obtain dynamic braking, the braking contactor B is closed, the forward and reverse contactors F and R being open so that the excitation of the motor 1 will be dependent upon the current supplied by the rectifier 9 and therefore on the control currents supplied to the transductor 15. The dynamic braking being initiated with the moving electrodes 7 in their uppermost position providing maximum rotor resistance, the operation may be controlled by the control means 28 automatically or in accordance with the movement of the driver's lever 22. For increasing the braking torque or maintaining a given torque as the speed of the motor falls under the dynamic braking, the electrodes 7 are lowered by the servo device 23 so as to reduce the rotor resistance. In the uppermost position of the electrodes and during an initial part of the range of movement thereof, the contacts 21 are open so that the control winding 42 of the transductor is de-energised and the output of the mercury arc rectifier 9 and therefore the motor excitation are dependent only on the current supplied to the control winding 41. This current is controlled by the potentiometer 18, the moving contact of which is actuated by the link 29 in unison with the movable electrodes 7 so as to vary the motor excitation simultaneously with the rotor resistance to provide control of the motor torque as hereinbefore described independently of the rotor current.

When the electrodes 7 are fully raised, the moving contact of the potentiometer 18 is in its extreme left-hand position in Fig. 2, giving minimum control ampere turns on the transductor 15 and minimum stator current. The excitation is thus progressively increased as the rotor resistance is reduced by the downward movement of the electrodes 7. At a predetermined position of the electrodes 7, the mechanical connection 50 causes closure of the contacts 21. This position may for example be at one-fifth of the total range of electrode travel and the potentiometer 18 may at this position have produced a motor excitation of for example about 30% of the peak value. The contacts 21 remain closed during the movement of the electrodes 7 from said predetermined point in their travel to the lowermost position. For this purpose, the contacts may be spring-mounted or may be sliding contacts as will be clear to those skilled in the art. The closure of the contacts 21 causes energisation of the control winding 42 of the transductor 15 in accordance with the voltage appearing across the resistor 49. The current in said resistor is derived from the current transformers 19 in accordance with the rotor current of the motor so that the transductor will now control the excitation of the motor in dependence on the magnitude of the rotor current. The potentiometer 18 is arranged, such as by means of the bar contact 18a, so that further downward movement of the electrodes 7 does not modify the voltage applied to the control winding 41. For any value of the rotor resistance between said predetermined position and the lowermost position of the electrodes 7, therefore, the motor excitation is controlled in accordance with a predetermined function of the rotor current. The arrangement will now provide for increase of excitation up to the maximum or peak value in accordance with increase of rotor current as the rotor resistance is further reduced, but independently of the position of the movable electrodes.

With this arrangement, the co-ordinated control, namely simultaneous control of the excitation in accordance with the rotor resistance position, is operative through the initial torque range, and variations in electrolytic strength and other factors which adversely affect the relationship between the variable quantities and thereby tend to introduce instability do not affect the final peak torque nor the torque characteristics at the upper torque range.

It will be understood that the equipment will include any suitable control means for governing the contactors, F, R, and B whereby to select forward and reverse motoring or braking operation at will. It will be understood that the arrangements for obtaining motoring operation may be of any suitable form as well known in the art and since they per se form no part of the present invention it is considered unnecessary that they should be described herein. It will be sufficient to state that the control lever 22 or a further control lever, or the other control means at 28 of the kinds hereinbefore indicated, may be arranged to govern the operation of said contactors, and may be employed during motoring to control the motoring torque by control of the rotor resistance 6.

In the arrangement shown in Fig.s 1 and 2, the transition from control of the excitation current in dependence on the adjustment of the load resistance to control of the excitation current in accordance with the rotor current is obtained directly in dependence upon the position of the moving electrodes of the resistance, namely by means of the auxiliary contacts 21. It will be understood however that the transition may be effected by other means directly or indirectly representative of the value of the load resistance. For example, the control of the excitation current in dependence on the rotor current may be obtained by means which respond to the value of the rotor current. During the lower range of values of resistance, the excitation current then depends on the position of the moving electrodes, whilst the rotor current depends both on the rotor resistance, namely the position of the electrodes, and the excitation current. Since at these times the excitation current is being increased whilst the rotor current is being reduced, the rotor current will exceed a predetermined or reference value when the joint effect of the reduction of rotor resistance and increase of excitation becomes sufficient. The rotor current is at these times thus representative of the rotor resistance and may be employed for obtaining the transition from the control of excitation from the rotor resistance to control of excitation in accordance with the rotor current.

In one convenient arrangement for operation in the manner just above indicated, in place of the auxiliary contacts 21 above referred to, a polarised rectifier circuit is employed. This circuit may comprise a fixed polarising resistor included in series in conductors 20 in place of the contacts 21, the ends of this resistor being connected with a constant voltage source, conveniently being connected with the output terminals of the rectifier 44 in Fig. 2. A rectifier, conveniently a dry plate rectifier, is connected in circuit between said resistor and the load resistor 49. The polarity of the polarising resistor is such that the reference voltage appearing thereacross acts in the circuit of the winding 42 in opposition to the voltage derived from the load resistor. Consequently, when the rotor current has lower values in a lower range, the voltage appearing across resistor 49 is less than that appearing across the polarising resistor, but the rectifier prevents flow of current in the winding 42. At a given position of the electrodes (or, more accurately, at a given value of rotor resistance) the voltage across the resistors 49 exceeds that across the polarising resistor, and the rectifier then allows current to flow in the direction of the resultant voltage, and the output voltage of the potentiometer 18 then remaining constant in spite of further reduction of rotor resistance, the current passed by the rectifier to the winding 42 controls the excitation current in accordance with the rotor current. It will be clear that with this arrangement no abrupt change of control ampere turns occurs at the transition point.

In general, the excitation control in arrangements of the kind just above indicated will include input circuit arrangements connected respectively with means for deriving input quantities dependent respectively on the position of a movable control member for the load resistance and on the current in the associated winding of the motor, and means responsive to the current in said winding exceeding a reference value whereby to render the excitation dependent on said current at predetermined values of said current corresponding with the higher range of values of the load resistance.

What we claim is:

1. An alternating current induction motor equipment having control means for obtaining dynamic braking by supplying excitation current to one winding of the motor and controlling load resistance in circuit with a second winding of the motor, in which said control means comprise means for controlling the value of excitation of the motor, means representative of the value of said load resistance, and means responsive to the current in said second winding, in combination with means rendering the excitation dependent on the value of load resistance or on said current responsive means, dependent upon whether said resistance is within a higher or lower range of values.

2. An alternating current induction motor equipment as claimed in claim 1, including a movable control member for the load resistance, and in which the excitation control means include input circuit arrangements connected respectively with means for deriving input quantities dependent respectively on the position of the movable control member for the load resistance and on the current in the second winding of the motor together with switching means coupled with said movable control member for the local resistance for controlling the input circuit arrangement responsive to said current.

3. An alternating current induction motor equipment as claimed in claim 1, including a movable control member for the load resistance, and in which the excitation control means include input circuit arrangements connected respectively with means for deriving input quantities dependent respectively on the position of the movable control member for the load resistance and on the current in the second winding of the motor, and means responsive to the current in said second winding exceeding a reference value to render the excitation dependent on said current at predetermined values of said current corresponding with the higher range of values of the load resistance.

4. An alternating current induction motor equipment as claimed in claim 1, including means for adjusting the load resistance, and in which said excitation control means comprise a transductor having controlling windings connected respectively for energisation in accordance with the adjustment of the load resistance and the current in the second winding of the motor.

5. An alternating current induction motor equipment as claimed in claim 1, in which said load resistance is of the liquid type having movable electrodes and including a servo device connected to said electrodes for moving them to vary the value of the load resistance.

6. An alternating current induction motor equipment as claimed in claim 1, including a mercury arc rectifier having control elements connected with the excitation means, and in which the control means are arranged during dynamic braking to connect said one winding of the motor in the output circuit of the mercury arc rectifier.

7. An alternating current induction motor equipment as claimed in claim 1, in which the excitation means comprises a transductor, and the control means are arranged during dynamic braking to connect said one winding of the motor with the output circuit of the transductor, said transductor having a control winding connected with the excitation control means.

References Cited in the file of this patent

FOREIGN PATENTS

| | | |
|---|---|---|
| 518,476 | Great Britain | Feb. 28, 1940 |
| 535,016 | Great Britain | Mar. 26, 1941 |